United States Patent
Wang et al.

(10) Patent No.: US 10,033,512 B2
(45) Date of Patent: Jul. 24, 2018

(54) METHOD AND SYSTEM FOR HARQ OPERATION AND SCHEDULING IN JOINT TDD AND FDD CARRIER AGGREGATION

(71) Applicant: BlackBerry Limited, Waterloo (CA)

(72) Inventors: Yiping Wang, Allen, TX (US); Zhijun Cai, Ashburn, VA (US); David Nigel Freeman, Basingstoke (GB)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 15/198,137

(22) Filed: Jun. 30, 2016

(65) Prior Publication Data

US 2016/0308659 A1    Oct. 20, 2016

Related U.S. Application Data

(63) Continuation of application No. 14/033,256, filed on Sep. 20, 2013, now Pat. No. 9,386,602.

(51) Int. Cl.
| | |
|---|---|
| *H04J 3/00* | (2006.01) |
| *H04L 5/14* | (2006.01) |
| *H04W 74/02* | (2009.01) |
| *H04L 1/18* | (2006.01) |
| *H04L 5/00* | (2006.01) |

(52) U.S. Cl.
CPC ............... *H04L 5/14* (2013.01); *H04L 1/1854* (2013.01); *H04L 1/1861* (2013.01); *H04L 1/1864* (2013.01); *H04L 5/0055* (2013.01); *H04W 74/02* (2013.01)

(58) Field of Classification Search
CPC ... H04L 1/1854; H04L 1/1861; H04L 1/1864; H04L 5/0055; H04L 5/14; H04W 74/02
See application file for complete search history.

(56) References Cited

U.S. PATENT DOCUMENTS

| | | | |
|---|---|---|---|
| 2011/0029833 A1 | 2/2011 | Zhang et al. | |
| 2011/0138244 A1 | 6/2011 | Zhu et al. | |
| 2012/0207107 A1* | 8/2012 | Li | H04W 52/58 370/329 |
| 2012/0230273 A1 | 9/2012 | He et al. | |

(Continued)

FOREIGN PATENT DOCUMENTS

| | | |
|---|---|---|
| EP | 2690815 | 1/2014 |
| WO | 2012128558 | 9/2012 |

OTHER PUBLICATIONS

The International Search Report and Written Opinion dated Dec. 16, 2014; in PCT patent application No. PCT/EP2014/069230.

(Continued)

*Primary Examiner* — Kan Yuen
(74) *Attorney, Agent, or Firm* — Fish & Richardson P.C.

(57) ABSTRACT

A method at a user equipment for hybrid automatic repeat request (HARQ) operation, the user equipment operating on a primary carrier having a first duplex mode and on at least one secondary carrier having a second duplex mode, the method using HARQ timing of the first duplex mode if the timing of the first duplex mode promotes acknowledgement opportunities over using HARQ timing of the second duplex mode; and using HARQ timing of the second duplex mode if the timing of the second duplex mode promotes acknowledgement opportunities over using HARQ timing of the first duplex mode.

16 Claims, 12 Drawing Sheets

(56) References Cited

U.S. PATENT DOCUMENTS

| | | | |
|---|---|---|---|
| 2014/0022960 A1 | 1/2014 | Fu et al. | |
| 2014/0119246 A1 | 5/2014 | Yin et al. | |
| 2014/0293893 A1* | 10/2014 | Papasakellariou | H04W 72/04 370/329 |
| 2015/0117272 A1* | 4/2015 | Gao | H04L 1/1861 370/280 |

OTHER PUBLICATIONS

LG Electronics; "CA-based aspects for FDD-TDD joint operation", 3GPP Draft; R1-133372 LGE-CA-Based FDD TDD, 3rd Generation partnership project (3GPP) Aug. 10, 2013; URL:http//www.3gpp.org/ftp/tsg_ran/WG1_R1/TSGR1_74/Docs.

3GPP TS 36.211, "Evolved Universal Terrestrial Radio Access (E-UTRA); Physical Channels and Modulation," V.11.0.0 (Release 11), Sep. 2012.

3GPP TS 36.213, "Evolved Universal Terrestrial Radio Access (E-UTRA); Physical layer procedures," V.11.2.0 (Release 11), Apr. 2013.

3GPP TSG RAN meeting #60 RP-130888 Oranjestad, Aruba, Jun. 11-14, 2013 "New WI: L TE TDD-FDD Joint Operation" Nokia Corporation.

3GPP TS 36.321, "Evolved Universal Terrestrial Radio Access (E-UTRA); Medium Access Control (MAC) protocol specification," V.11.1.0 (Release 11), Feb. 2013.

3GPP TS 36.331, "Evolved Universal Terrestrial Radio Access (E-UTRA); Radio Resource Control (RRC); Protocol specification," V.11.1.0 (Release 11), Nov. 2012.

Office Action issued in Canadian Application No. 2,924,721 dated Nov. 28, 2016; 4 pages.

* cited by examiner

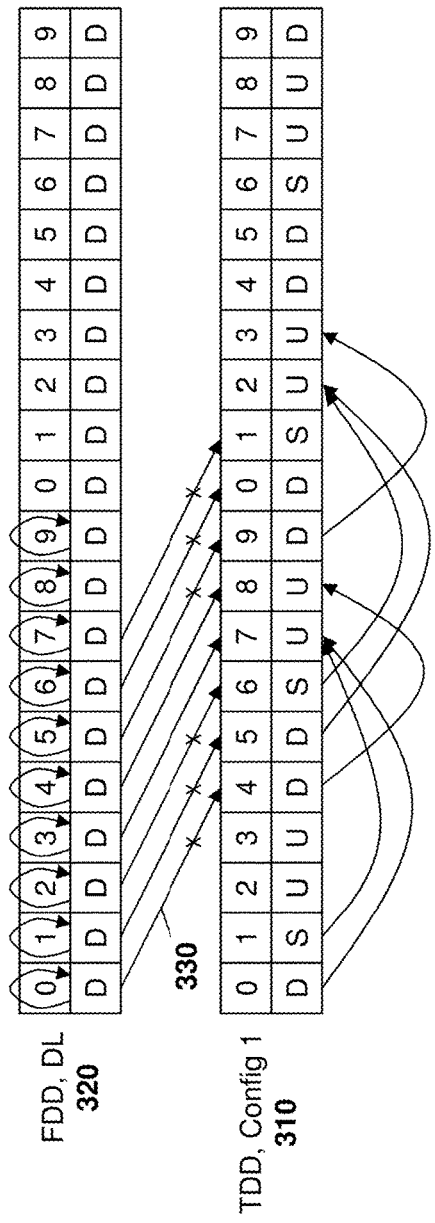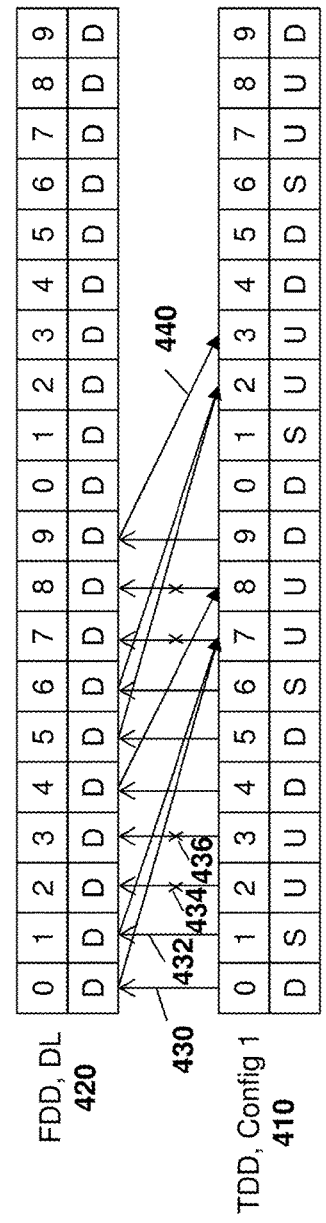

METHOD AND SYSTEM FOR HARQ OPERATION AND SCHEDULING IN JOINT TDD AND FDD CARRIER AGGREGATION

CROSS REFERENCE TO RELATED APPLICATION

This application is a continuation and claims priority to U.S. Non-Provisional application Ser. No. 14/033,256, filed Sep. 20, 2013, the entire contents of which is hereby expressly incorporated by reference herein in its entirety.

FIELD OF THE DISCLOSURE

The present disclosure relates to hybrid automatic repeat request (HARQ) operation and scheduling in carrier aggregation, and in particular relates to HARQ operation and scheduling in carrier aggregation systems using combined frequency division duplex (FDD) and time division duplex (TDD) modes.

BACKGROUND

In the 3$^{rd}$ Generation Partnership Project (3GPP) Long Term Evolution (LTE) Architecture, downlink and uplink transmissions are organized into one of two duplex modes. These modes are frequency division duplex mode and a time division duplex mode. Frequency division duplex mode uses paired spectrum to separate the uplink and downlink transmissions while the TDD mode uses a common spectrum and relies on time multiplexing to separate uplink and downlink transmissions.

With FDD, the acknowledgement for a transmission typically occurs a set number of subframes after the transmission has been received. For example, in many systems the acknowledgement is sent back to the network from the user equipment (UE) four subframes after receipt of the transmission. In TDD, depending on the TDD mode, the HARQ feedback is sent in a predefined manner to the network once a transmission is received.

In order to increase data throughput, carrier aggregation may be utilized in LTE-advanced systems. To support 3GPP carrier aggregation, a LTE-advanced UE may simultaneously receive or transmit on one of multiple component carriers. In some cases, component carriers utilize the same duplex mode, and the HARQ operation and scheduling of the component carriers is therefore relatively straightforward. However, in some cases a secondary component carrier may be operating in a different duplex mode than a primary component carrier. In this case, the HARQ operation and scheduling are currently undefined.

BRIEF DESCRIPTION OF THE DRAWINGS

The present disclosure will be better understood with reference to the drawings, in which:

FIG. 3 is a timing diagram showing HARQ operation on a secondary FDD carrier with a primary carrier in TDD mode utilizing FDD PDSCH HARQ timing;

FIG. 4 is a timing diagram showing PDSCH HARQ and scheduling timing of a secondary FDD carrier from a primary carrier in TDD mode;

FIG. 5 is a timing diagram showing PUSCH HARQ and scheduling timing of a secondary FDD carrier from a primary carrier in TDD mode;

FIG. 6 is a timing diagram showing a secondary FDD carrier utilizing the TDD configuration PDSCH HARQ timing of the primary cell;

FIG. 9 is a timing diagram showing a secondary FDD carrier utilizing TDD configuration 2 timing for HARQ operation for a primary carrier having 5 ms periodicity;

FIG. 10 is a timing diagram showing a secondary FDD carrier utilizing TDD configuration 5 timing for HARQ operation for a primary carrier having 10 ms periodicity;

FIG. 12 is a timing diagram showing a secondary FDD carrier utilizing TDD configuration 5 timing for HARQ operation;

FIG. 13 is a timing diagram showing HARQ operation on a secondary FDD carrier utilizing a next available subframe on a primary TDD carrier;

FIG. 14 is a timing diagram showing cross carrier scheduling from a primary TDD carrier for a secondary FDD carrier;

FIG. 15 is a block diagram showing a bitmap for use with cross carrier scheduling;

DETAILED DESCRIPTION OF THE DRAWINGS

The present disclosure provides a method at a user equipment for hybrid automatic repeat request (HARQ) operation, the user equipment operating on a primary carrier having a first duplex mode and on at least one secondary carrier having a second duplex mode, the method comprising: using HARQ timing of the first duplex mode if the timing of the first duplex mode promotes acknowledgement opportunities over using HARQ timing of the second duplex mode; and using HARQ timing of the second duplex mode if the timing of the second duplex mode promotes acknowledgement opportunities over using HARQ timing of the first duplex mode.

The present disclosure further provides a user equipment for hybrid automatic repeat request (HARQ) operation, the user equipment operating on a primary carrier having a first duplex mode and on at least one secondary carrier having a second duplex mode, the user equipment comprising a processor configured to: use HARQ timing of the first duplex mode if the timing of the first duplex mode promotes acknowledgement opportunities over using HARQ timing of the second duplex mode; and use HARQ timing of the second duplex mode if the timing of the second duplex mode promotes acknowledgement opportunities over using HARQ timing of the first duplex mode.

In an LTE system, downlink and uplink transmissions are organized into one of two duplex modes, namely FDD and TDD modes. FDD mode uses paired spectrum to separate the uplink and downlink transmissions, while in TDD mode, common spectrum is used and the mode relies on time multiplexing to separate uplink and downlink transmissions.

While the present disclosure is described below with regard to 3$^{rd}$ Generation Partnership Project (3GPP) Long Term Evolution Network Architecture, the present disclosure is not limited to LTE. Other network architectures including a TDD mode and an FDD mode may also utilize the HARQ operation and scheduling embodiments described herein.

Figure 1:
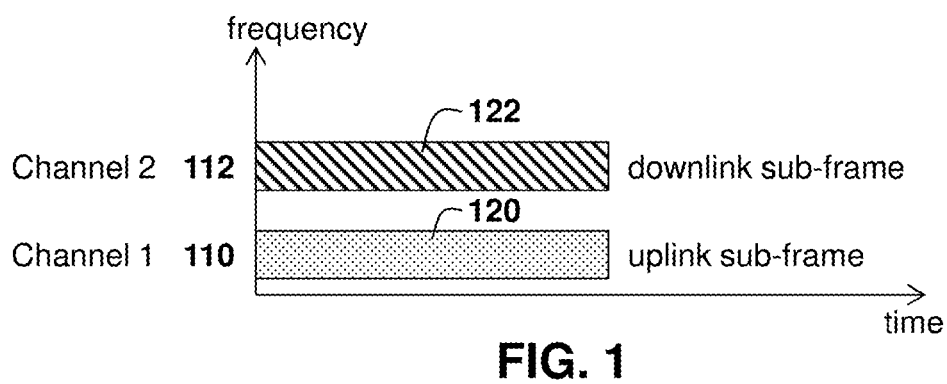
FIG. 1 a graph showing an example of uplink and downlink subframes in a frequency division duplex mode.

Reference is now made to FIG. 1, which shows downlink and uplink transmissions for an FDD mode. In particular, the embodiment of FIG. 1 has a first channel 110 and a second channel 112. Channel 110 is used for uplink subframes 120, while channel 112 is used for downlink subframes 122.

Figure 2:
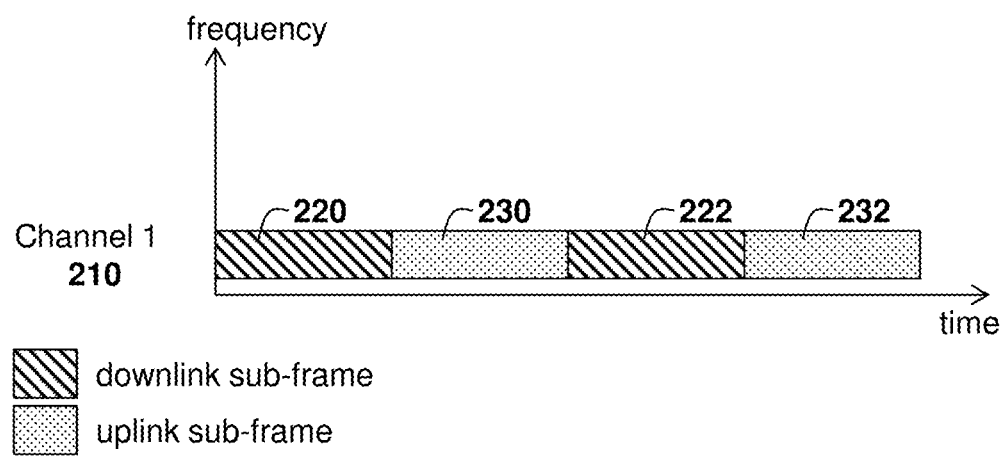
FIG. 2 is a graph showing an example of uplink and downlink subframes in a time division duplex mode.

Referring to FIG. 2, a time division duplex system is shown having only one channel 210, where the downlink and uplink subframes are duplexed together on the channel. In particular, in the embodiment of FIG. 2, downlink subframes 220 and 222 are interspersed with uplink subframes 230 and 232.

While the embodiment of FIG. 2 shows an alternation between uplink and downlink subframes, other configurations are possible. Specifically, in a 3GPP LTE TDD system, a subframe of a radio frame can be a downlink, an uplink, or a special subframe. The special subframe comprises downlink and uplink time regions separated by a guard period to facilitate downlink to uplink switching. In particular, each special subframe includes three parts: a downlink pilot time slot (DwPTS), an uplink pilot time slot (UpPTS) and a guard period (GP). Physical downlink shared channel (PDSCH) transmissions may be made in a downlink subframe or in the DwPTS portion of a special subframe.

The 3GPP Technical Specification (TS) 36.211, "*Evolved Universal Terrestrial Radio Access (E-UTRA); Physical Channels and Modulation*", v.11.0.0, Sep. 19, 2012, the contents of which are incorporated herein by reference, defines seven different uplink/downlink configuration schemes in LTE TDD operations. These are shown below with regard to Table 1.

TABLE 1

LTE TDD Uplink-Downlink Configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, the "D" is for a downlink subframe, the "U" is for uplink subframes, and the "S" is for special subframes.

Thus, as shown in Table 1 above, there are two switching point periodicities specified in the LTE standard for TDD. They are 5 ms and 10 ms, of which the 5 ms switching point periodicity is introduced to support the co-existence between LTE and low chip rate universal terrestrial radio access (UTRA) TDD systems. The 10 ms switching point periodicity is for the coexistence between LTE and a high chip rate UTRA TDD system.

The seven UL/DL configurations of Table 1 cover a wide range of uplink/downlink allocations, ranging from downlink heavy 1:9 ratio in configuration 5 to UL heavy 3:2 ratio in configuration 0.

Based on the configurations, as compared to FDD systems, TDD systems have more flexibility in terms of the proportion of resources assignable to uplink and downlink communications within a given assignment of spectrum. In other words, TDD systems can distribute the radio resources unevenly between the uplink and the downlink, enabling potentially more efficient radio resource utilization by selecting an appropriate uplink/downlink configuration based on interference situations and different traffic characteristics in the uplink and downlink.

HARQ provides an acknowledgement or a negative acknowledgement of the reception of a data transmission. In an LTE FDD system, the UE and evolved node B (eNB) processing times for both the downlink and uplink receipt are fixed because of the continuous downlink and uplink transmission and reception and invariant downlink and uplink subframe configuration. In particular, the UE, upon detection on a given serving cell of a physical downlink control channel (PDCCH) with a downlink control information (DCI) format 0/4 and/or a physical HARQ indication channel (PHICH) transmission in subframe n intended for the UE, adjusts the corresponding physical uplink shared channel (PUSCH) transmission in subframe n+4 according to the PDCCH and PHICH information.

On the downlink, the UE, upon detection of the PDSCH transmission in subframe n−4 intended for the UE and for which an HARQ-acknowledgement is provided, transmits the HARQ acknowledgement response in subframe n.

Conversely, in a TDD system, since the uplink and downlink transmissions are not continuous, such that the transmissions do not occur in every subframe, the scheduling and HARQ timing relationships are separately defined in the LTE specifications.

Currently, the HARQ ACK/NACK timing relationship for the downlink is defined by Table 10.1.3.1-1 in the 3GPP TS 36.213, "*3rd Generation Partnership Project; Technical Specification Group Radio Access Network; Evolved Universal Terrestrial Radio Access (E-UTRA); Physical layer procedures (Release 11)*", v. 11.3.0, June 2013, the contents of which are incorporated herein by reference. The table is reproduced in Table 2 below.

In Table 2, an association is made between an uplink subframe n, which conveys the ACK/NACK, with downlink subframes n−$k_i$, i=0 to M−1. For example, with uplink/downlink TDD configuration 0, subframe 2 will convey an ACK/NACK bit for the PDSCH on subframe 6.

TABLE 2

Downlink Association Set Index K: $\{k_0, k_1, \ldots k_{M-1}\}$

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |

TABLE 2-continued

| Downlink Association Set Index K: {$k_0, k_1, \ldots k_{M-1}$} | | | | | | | | | | |
|---|---|---|---|---|---|---|---|---|---|---|
| UL-DL | Subframe n | | | | | | | | | |
| configuration | 0 | 1 | 2 | 3 | 4 | 5 | 6 | 7 | 8 | 9 |
| 5 | — | — | 13, 12, 9, 8, 7, 5, 4, 11, 6 | | — | — | — | — | — | — |
| 6 | — | — | 7 | | 7 | 5 | — | — | 7 | 7 | — |

Further, in 3GPP TS 36.213, Table 8.3-1, which is shown below with regard to Table 3, indicates that the PHICH ACK/NACK received in a downlink sub-frame i is linked with the uplink data transmission in the uplink subframe i–k, where k is given in Table 3. For example, with the uplink/downlink TDD configuration 1, subframe 1 conveys the ACK/NACK bit for the PUSCH on subframe 7 (i=1, k=4 from Table 3 below, thus i–k=subframe 7). Additionally, for the uplink/downlink configuration 0, in subframes 0 and 5, when the $I_{PHICH}=1$, k=6. This is because there may be two ACK/NACKs for a UE transmitted on the PHICH in subframes 0 and 5, one being represented by $I_{PHICH}=1$ and the other by $I_{PHICH}=0$.

TABLE 3

| k for HARQ ACK/NACK | | | | | | | | | | |
|---|---|---|---|---|---|---|---|---|---|---|
| TDD UL-DL | Subframe number i | | | | | | | | | |
| configuration | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | | 6 | | |
| 3 | 6 | | | | | | | 6 | 6 | |
| 4 | | | | | | | | 6 | 6 | |
| 5 | | | | | | | 6 | | | |
| 6 | 6 | 4 | | | | 7 | 4 | | | 6 |

The uplink grant, ACK/NACK and transmission/retransmission relationship provided below with regard to Table 4. Table 4 represents Table 8.2 of the 3GPP TS 36.213 Technical Specification.

TABLE 4

| k for PUSCH transmission | | | | | | | | | | |
|---|---|---|---|---|---|---|---|---|---|---|
| TDD UL-DL | Subframe number n | | | | | | | | | |
| configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

In Table 4, the UE, upon detection of a PDCCH with DCI format 0/4 and/or a PHICH transmission in subframe n intended for the UE, adjusts the corresponding PUSCH transmission in sub-frame n+k, where k is given in the table.

For example, for TDD uplink/downlink configuration 0, if the least significant bit (LSB) of the uplink index in the DCI format 0/4 is set to 1 in sub-frame n or a PHICH is received in sub-frame n=0 or 5 in the resource corresponding to $I_{PHICH}=1$, or the PHICH is received in sub-frame n=1 or 6, the UE may adjust the corresponding PUSCH transmission in sub-frame n+7.

If, for TDD uplink/downlink configuration 0, both the most significant bit and least significant bit of the UL index in the DCI format 0/4 are set in sub-frame n, the UE may adjust the corresponding PUSCH transmission in both sub-frames n+k and n+7, where k is given by Table 4.

As seen above, both grant and HARQ timing linkage in TDD are more complicated than the fixed time linkages used in LTE FDD systems.

Carrier Aggregation

To meet the need of rapidly growing UE throughput, a maximum of 100 MHz bandwidth is specified for the LTE-advanced systems. Carrier aggregation enables multiple component carriers, which use up to 20 MHz bandwidth, to be aggregated to form a wider total bandwidth.

To support 3GPP carrier aggregation, in LTE-A, a UE may simultaneously receive or transmit on one or multiple component carriers (CCs). Multiple CCs could be from the same eNB or from different eNBs. In an FDD system, the number of CCs aggregated in the downlink could be different from that in the uplink.

For CA, there is one independent hybrid-ARQ entity per serving cell in each of the uplink or downlink. Multiple aggregated cells (carriers) use multiple HARQ entities. However, each UE has only one radio resource control (RRC) connection with the network.

The serving cell handling the RRC connection establishment or re-establishment or handover is referred to as the Primary Cell (PCell). The carrier corresponding to the PCell in the downlink is termed the downlink primary component carrier (DL PCC) while in the uplink the uplink primary component carrier (UL PCC).

Other serving cells are referred to as secondary cells (SCells) and their corresponding carriers are referred to as secondary component carriers (SCC).

The carriers may be aggregated intra-band, such that they use the same operational band, and/or inter-band, where a different operational band is used.

The configured serving cell set for a UE consists of one PCell and one or more SCells.

Cross Carrier Scheduling

In addition to the normal carrier self-scheduling in Release 8 or 9 of the LTE specifications, cross-carrier scheduling is also possible. A PDCCH on one carrier can relate to data on the PDSCH or PUSCH of another carrier. Self-scheduling means that the shared data channel, PDSCH or PUSCH, of a carrier is scheduled by the PDCCH which is transmitted on the same carrier, while cross-scheduling means that the shared data channel, PDSCH or PUSCH, of a carrier is scheduled by the PDCCH which is transmitted on another carrier.

For carrier aggregation, information on the component carriers that a UE needs to monitor is notified by the eNB via MAC and RRC messaging. This may help reduce the UE's power consumption as the UE only needs to monitor the component carriers configured for possible scheduling information.

For a UE monitoring more than one component carrier, the scheduling information for each subframe is sent on a scheduling carrier. In particular, the scheduling carrier could be a PCell or SCell. However, the PCell can only be scheduled by the PCell itself.

Further, the PUCCH is only allowed to be transmitted on the PCell. This is the same for FDD and TDD systems.

For uplink grants, after demodulation of PUSCH, the corresponding uplink ACK or NACK is carried by the PHICH, which is transmitted from the scheduling carrier.

This is the same for FDD and TDD systems.

In 3GPP TS36.331, "*3rd Generation Partnership Project; Technical Specification Group Radio Access Network; Evolved Universal Terrestrial Radio Access (E-UTRA); Radio Resource Control (RRC); Protocol specification (Release 11)*", v. 11.4.0, June 2013, the contents of which are incorporated herein by reference, networks can send an RRC configuration message containing a CrossCarrierSchedulingConfig information element (IE) to further configure the cross-carrier scheduling. The CrossCarrierSchedulingConfig IE includes at least the following fields:
  a. schedulingCellID: to notify a UE where (at which cell/carrier) to monitor the PDCCH (self-scheduling or cross-carrier scheduling).
  b. pdsch-Start: the starting OFDM symbol of PDSCH for the concerned SCell. Values 1, 2, 3 are applicable when dl-Bandwidth for the concerned SCell is greater than 10 resource blocks, values 2, 3, 4 are applicable when dl-Bandwidth for the concerned SCell is less than or equal to 10 resource blocks. This can be treated as a virtual PCFICH.

The activation/deactivation of component carriers is done via MAC control elements. As a result, a UE with cross-carrier scheduling and with more than one carrier activated needs only to monitor the PDCCH on the scheduling cell. In other words, there is no need to monitor the PDCCH on the scheduled cell and there is no need to detect the physical control format indicator channel (PCFICH) to derive the starting symbol of the PDSCH for the scheduled cell.

Regarding the above, although the current LTE specifications can operate in two different duplex modes, it is unclear how a device would operate jointly between an FDD and a TDD duplex mode. Specifically, the use of combined FDD/TDD joint operation enables effective use of reallocated spectrum through a combination of two duplex modes. For example, a first deployment scenario of TDD/FDD joint operation may be by carrier aggregation. This supports either TDD or FDD as the primary cell. Given the fact that the current HARQ operation is defined separately for TDD and FDD modes, and since they are largely different, the use of HARQ operations will run into some issues when two modes are jointly operated.

With regard to HARQ timing and scheduling issues, the various embodiments below are described with regard to the TDD carrier being configured as the primary cell and an FDD carrier being a secondary cell. However, this is not limiting and the embodiments described herein could equally be used with the FDD being the primary carrier.

Reference is now made to FIG. 3. As indicated above, only one PUCCH exists and is configured at the primary carrier. Thus HARQ for secondary carriers proceeds through the primary carrier.

FIG. 3 shows a self-scheduling case of PDSCH HARQ timing where a TDD primary carrier 310 with configuration 1 is aggregated with an FDD secondary carrier 320.

As seen in FIG. 3, the FDD uses self-scheduling ACKs, which are provided in four subframes from the received downlink transmission. Thus, the FDD carrier follows the existing FDD timing rules of the PDSCH HARQ-ACK. In the embodiment of FIG. 3, the PDSCH transmitted on subframes 0, 1, 2, 5, 6 and 7 cannot be properly acknowledged as shown by arrows 330 if using the PUCCH, due to the lack of an uplink subframe on the TDD primary carrier.

Further, referring to FIG. 4, for the same carrier aggregation case with cross-carrier scheduling, where the PDCCH on one carrier relates to data on another carrier, the PDSCH scheduling and HARQ timing is illustrated for such cross-carrier scheduling.

In particular, the primary carrier 410 operates in a TDD mode (configuration 1), whereas the secondary carrier 420 operates in an FDD mode. The scheduling is shown for example with references 430, 432, 434, 436.

As seen in FIG. 4, since subframes 2 and 3 on the primary carrier 410 are uplink subframes, subframes 2 and 3 on the FDD secondary carrier 420 cannot be scheduled.

In the embodiment of FIG. 4, the TDD is in configuration 1 and therefore subframes 2, 3, 7 and 8 cannot be cross-carrier scheduled.

The HARQ timing, shown for example with line 440 for HARQ on the secondary carrier 420 in subframe 9, may work properly for the subframes that are scheduled utilizing the TDD configuration for HARQ.

Figures 5, 6:
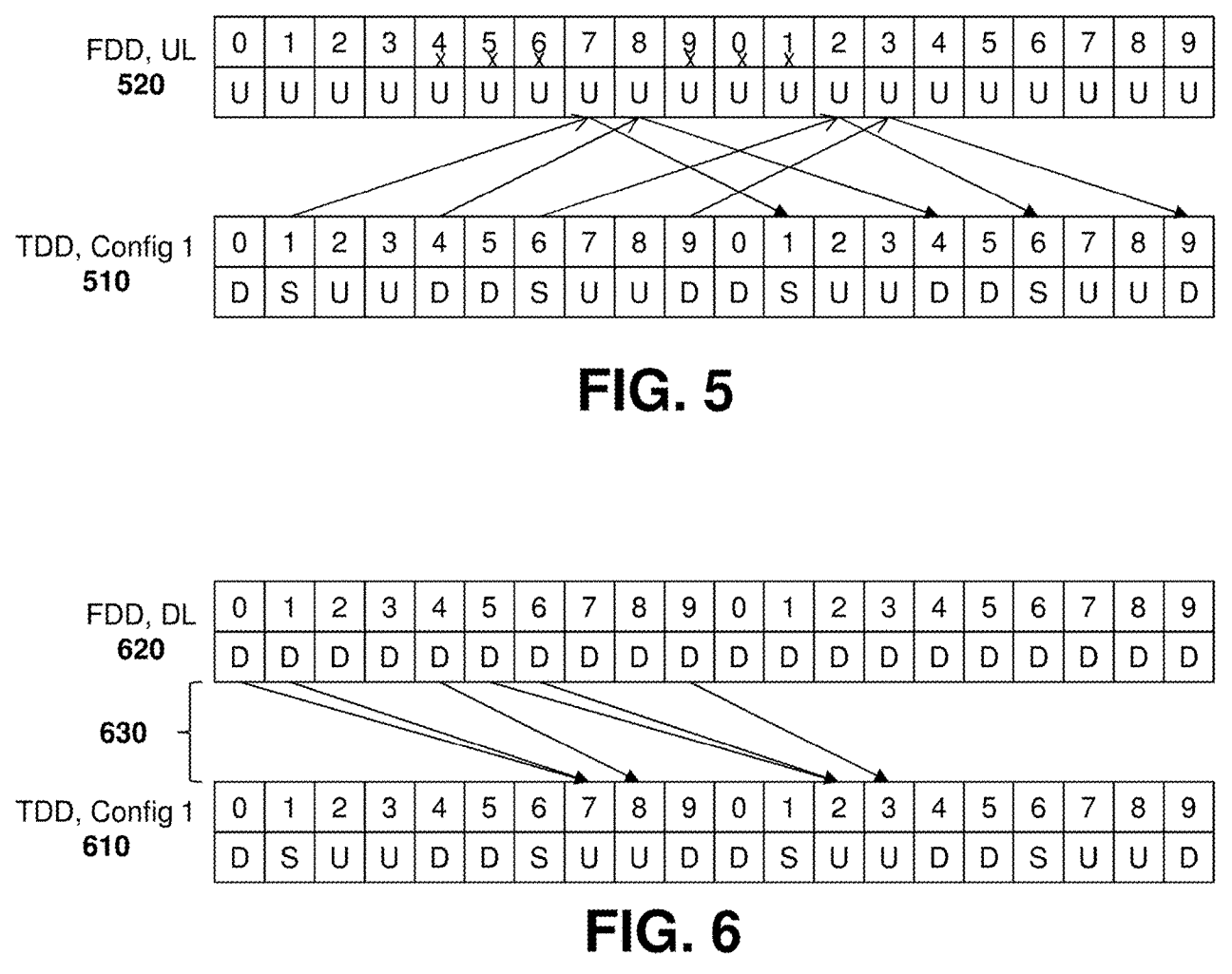

Similarly for the uplink, with FDD PUSCH and cross-carrier scheduling from a TDD carrier, the TDD PUSCH scheduling timing can only be used for subframes 1, 4, 6 and 9, as shown in FIG. 5.

In FIG. 5, the TDD configured carrier is the primary carrier 510 and the FDD configured carrier is the secondary carrier 520. As seen in FIG. 5, only subframes 1, 4, 6 and 9 may be used to schedule (6, 4, 6, 4 subframes later as in Table 4 above), therefore allowing only uplink subframes 2, 3, 7 and 8 to be cross-carrier scheduled from the TDD carrier. All other uplink subframes on the FDD carrier would become unusable for the UE.

In accordance with the above, various embodiments are provided below to overcome the HARQ operations and scheduling issues.

PDSCH HARQ-ACK Embodiments

Flexible PDSCH HARQ-ACK Timing

In accordance with one embodiment of the present disclosure, existing PDSCH HARQ-ACK timing may be fully reused for both TDD and FDD modes. No new PDSCH HARQ-ACK timing is required and the embodiment is applicable to both self and cross-carrier scheduling.

In particular, when a PCell is TDD and SCell is FDD, for the TDD carrier, the PDSCH HARQ-ACK timing follows timing corresponding to its own uplink/downlink TDD configuration. The PDSCH HARQ timing of the FDD carrier follows the reference timing. The reference timing is determined based on the primary cell TDD uplink/downlink configuration.

In particular, reference is now made to FIG. 6 in which primary cell 610 has a TDD configuration and secondary cell 620 has an FDD configuration. As seen in the embodiment of FIG. 6, the frames on the FDD carrier 620 that correspond with downlink or special subframes of TDD carrier 610 utilize the same HARQ timing. In other words, the subframes on FDD carrier 620 utilize the TDD configuration 1 timing for the subframes corresponding to downlink or special subframes.

Thus, as shown by arrows 630, the ACKs/NACKs are provided in the subframe corresponding to the configuration 1 timing. Thus, for subframe 0, the acknowledgement is provided in subframe 7 on the uplink for the TDD configuration 1. Similarly, subframe 1 is acknowledged on subframe 7 and subframe 4 is acknowledged on subframe 8.

In accordance with this embodiment, subframes 2, 3, 7 and 8 will not be able to be acknowledged.

The above may be therefore more useful when the PCell configuration is downlink subframe heavy. As will be appreciated by those in the art, when the TDD configuration is uplink heavy, a significant number of downlink subframes on the FDD carrier will be unusable.

Thus, with the embodiment of FIG. 6, the majority of the downlink PDSCHs are able to be properly acknowledged or negatively acknowledged, leaving a small portion of PDSCHs which do not have ACK/NACK linkage. In this case, the eNB may simply pass the ACK to a higher layer and let the RRC handle the package error.

When comparing the embodiment of FIG. 6 with that of only following FDD timing, the above is able to acknowledge 60% of the of the PDSCH downlink subframes, while only 40% of the PDSCH subframes can be acknowledged or negatively acknowledged when following FDD timing.

Figure 7:
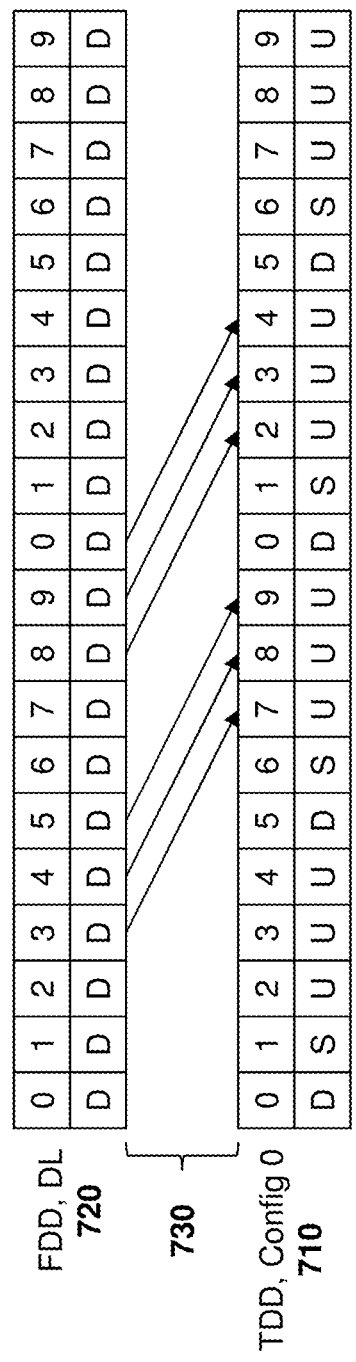
FIG. 7 is a timing diagram showing HARQ operation on a secondary FDD carrier with a primary TDD carrier utilizing FDD PDSCH HARQ timing.

On the other hand, when the primary cell TDD configuration is uplink subframe heavy, the reference timing may, in one embodiment, utilize the FDD PDSCH HARQ timing. Reference is now made to FIG. 7, which shows an example of FDD PDSCH HARQ timing using the TDD configuration 0 as primary cell. In accordance with Table 1 above, the configuration 0 is uplink subframe heavy with a ratio of 3:2.

In particular, the primary cell 710 is a TDD configuration 0 and the secondary cell 720 is an FDD configuration. As seen by arrows 730, the configuration allows subframes 3, 4, 5 and 8, 9, 0 to be acknowledged four subframes later.

In the example of FIG. 7, 60% of the PDSCHs are able to be properly acknowledged by following the FDD timing and 40% of the PDSCHs are not able to have an acknowledgement linkage.

Thus, in accordance with FIGS. 6 and 7, a decision can be made based on the configuration of the TDD at the primary cell as to which embodiment to use. The decision may be based on the efficiency of the HARQ technique, and the selection of whichever is more efficient is made. In the case where it is equally efficient to use either technique, (e.g. if the number of uplink subframes is the same as the number of downlink subframes in the TDD configuration of the primary cell), either the TDD configuration of the primary cell or the FDD HARQ timing can be considered as the reference timing.

Figure 8:
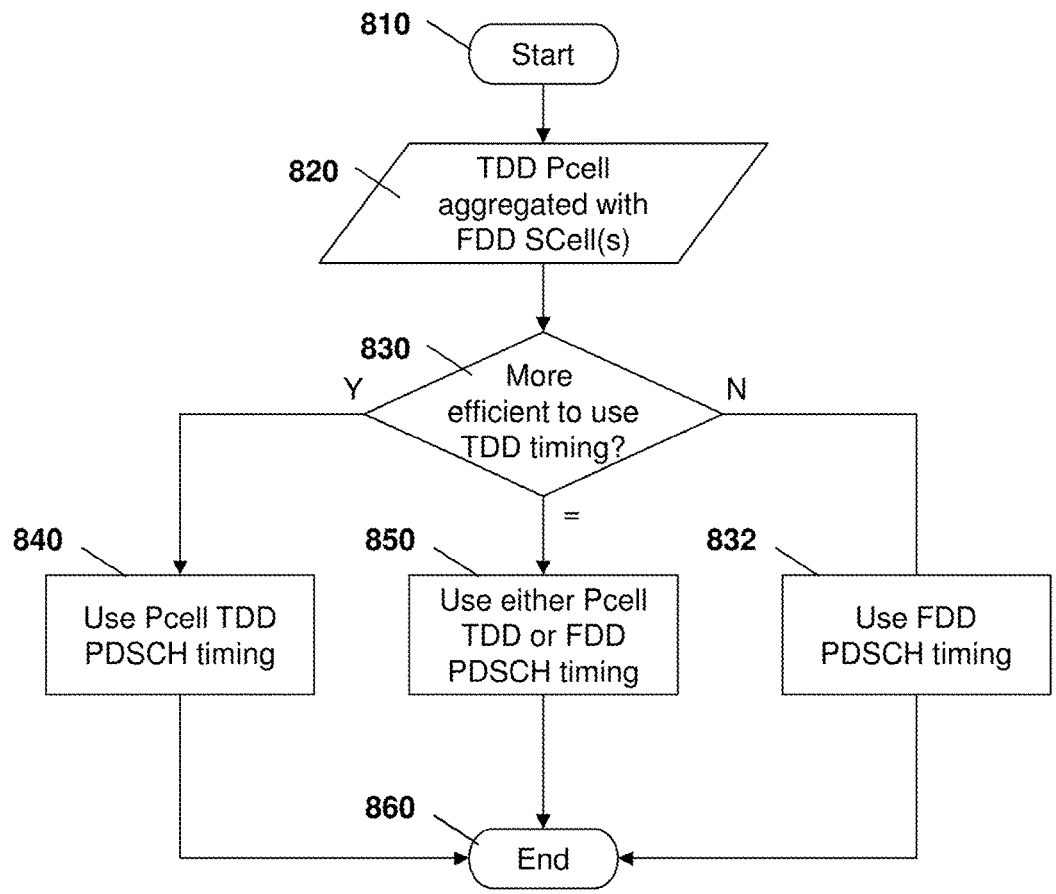
FIG. 8 is a flow diagram showing selection of HARQ timing operation on a secondary carrier.

Reference is now made to FIG. 8, which shows a process diagram of the above. In particular, the process of FIG. 8 starts at block 810 and proceeds to block 820 in which a precondition is that a TDD primary cell is aggregated with FDD secondary cells.

The process then proceeds to block 830 in which a check is made to determine whether it is more efficient to use TDD timing or FDD timing. For example, the determination for each of the secondary cells may be whether the number of uplink subframes is greater than the number of downlink subframes in the primary cell TDD configuration.

From block 830, if the TDD configuration is less efficient, the process proceeds to block 832 in which the FDD PDSCH timing is used, as shown in FIG. 7 above.

Conversely, if the TDD configuration is more efficient, for example if the number of DL subframes exceeds the number of UL subframes, the process proceeds from block 830 to block 840 in which the primary cell TDD PDSCH timing is utilized for the acknowledgements, as shown above with regards to FIG. 6.

If it is equally efficient to use either timing, for example if the number of uplink subframes and the number of downlink subframes are equal, then either the PCell TDD or the FDD PDSCH timing may be utilized. The choice may be specified for example in various standards or made by the carrier to a UE. In this case the process proceeds to block 850.

From blocks 832, 840 or 850, the process proceeds to block 860 and ends.

In one embodiment, the selection of the PDSCH HARQ timing may be handled by higher layer signalling. For example, the selection of the PDSCH HARQ timing may be embedded in the RRC reconfiguration message when the FDD SCell is added to the primary TDD carrier. In another example, the selection of the PDSCH HARQ timing may be embedded in a MAC control elements signalled to the UE.

Switching Periodicity Based Embodiment

In a further embodiment, the FDD secondary cell may be provided with a TDD uplink/downlink configuration utilizing a specific TDD configuration, regardless of the actual TDD configuration of the primary cell. In particular, the reference timing can follow TDD uplink/downlink configuration 2 from Table 1 above if the primary cell TDD configuration switching periodicity is 5 ms and timing may follow TDD uplink/downlink configuration 5 for switching periodicity of 10 ms.

Figures 9, 10:
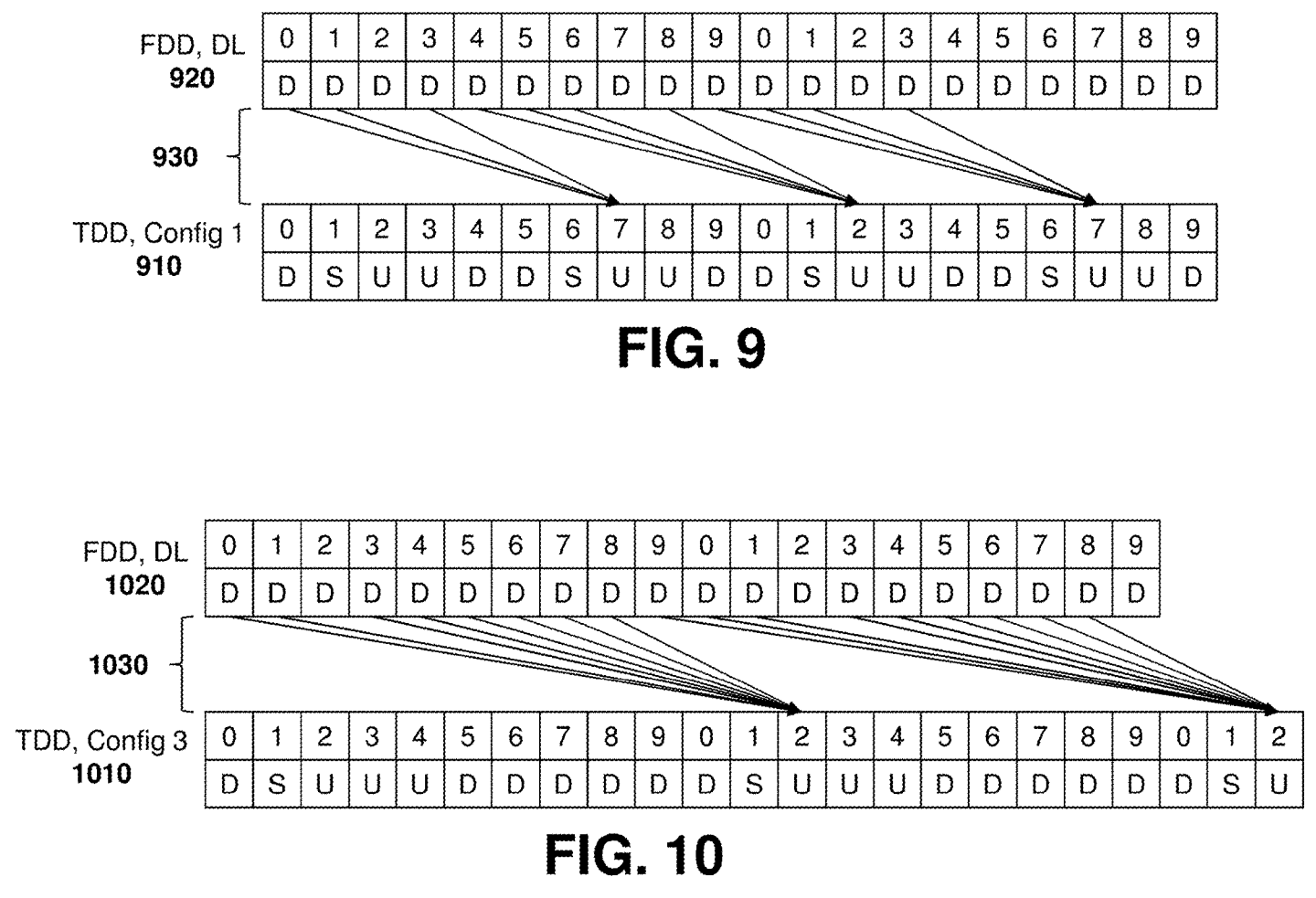

Reference is now made to FIG. 9, which shows an example of the timing method with a TDD configuration 1 as the primary cell.

In particular, as seen in FIG. 9, the primary cell 910 has TDD configuration 1 whereas the secondary cell 920 has an FDD configuration.

From Table 1 above, utilizing configuration 2 with a 5 ms periodicity, the uplink subframes are in subframes 2 and 7, which are used to provide the HARQ feedback. Thus, referring to FIG. 9, as shown by arrows 930, subframes 4, 5, 6 and 8 utilize subframe 2 in the next frame for the HARQ feedback. Similarly, subframes 9, 0, 1 and 3 utilize subframe 7 for the HARQ feedback.

FIG. 9 therefore shows an example where 80% of the PDSCH subframes can be properly acknowledged.

When the TDD switching periodicity is 10 ms, TDD configuration 5 PDSCH HARQ timing is used. From Table 1, configuration 5 only has one uplink subframe and thus the ability of the ACK/NACK is increased to 90%.

In particular, reference is made to FIG. 10 which shows an example of the timing method with a TDD configuration 3 as the primary cell 1010. The secondary cell 1020 has an FDD configuration. As TDD configuration 3 has a 10 ms periodicity, the TDD configuration 5 PDSCH HARQ timing is used.

Thus, as seen in FIG. 10, every subframe (except subframe 2) uses subframe 2 of the primary cell for acknowledgement. The acknowledgement, as with all embodiments herein, must be delayed by a minimum processing time, for example 4 subframes, and thus for subframes 9, 0 and 1 the acknowledgement waits until subframe 2 in a subsequent frame for the acknowledgement. The acknowledgements are shown with arrows 1030 in the example of FIG. 10.

Figure 11:
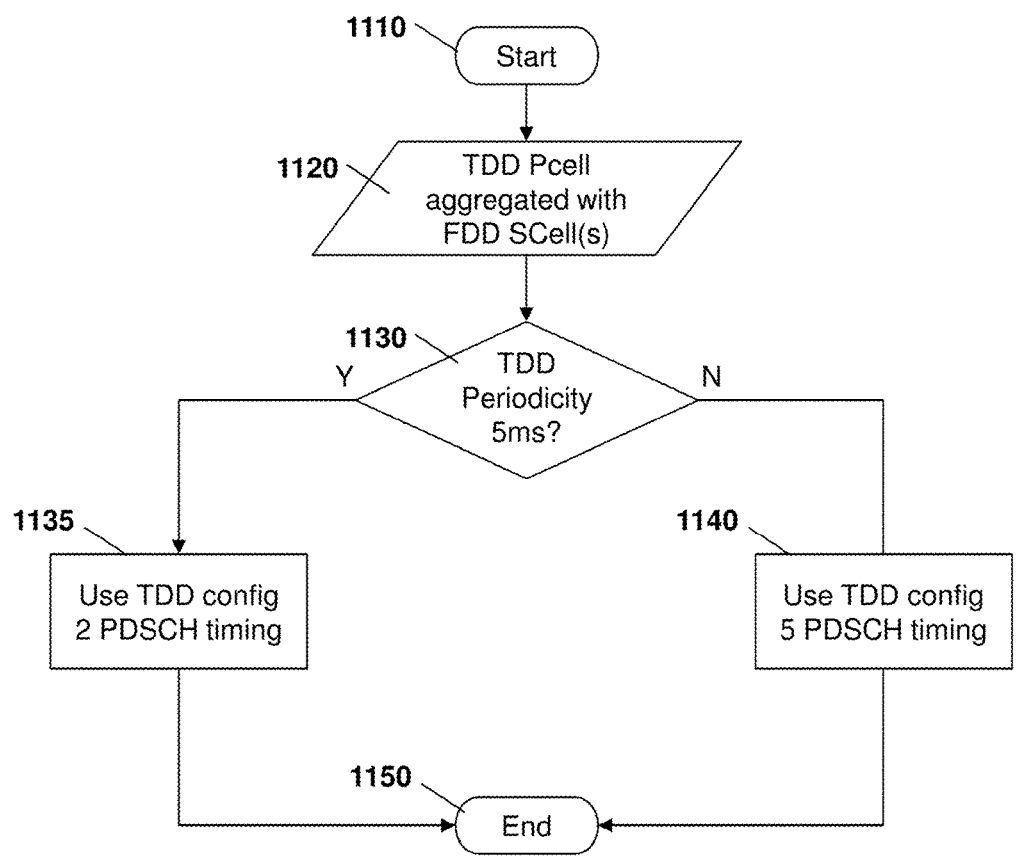
FIG. 11 is a flow diagram showing a selection of a TDD configuration for HARQ operation on a secondary carrier.

A process at a user equipment to determine which of the embodiments of FIGS. 9 and 10 above to use is provided with regard to FIG. 11. In particular, the process of FIG. 11 starts at block 1110 and proceeds to block 1120 in which a precondition is at a TDD primary cell is aggregated with FDD secondary cells.

The process then proceeds to block 1130 in which a determination is made whether the switching periodicity is 5 ms or 10 ms. From block 1130, if the periodicity is 5 ms the process proceeds to block 1135 in which TDD configuration 2 is used on the secondary cell for the PDSCH ACK timing.

Conversely, from block 1130 if the periodicity is 10 ms then the process proceeds to block 1140 in which the TDD configuration 5 PDSCH timing is utilized.

From blocks 1135 and 1140 the process proceeds to block 1150 and ends.

In a further alternative embodiment, the timing for TDD configuration 5 PDSCH HARQ may be used regardless of the TDD switching periodicity.

Figures 12, 13:
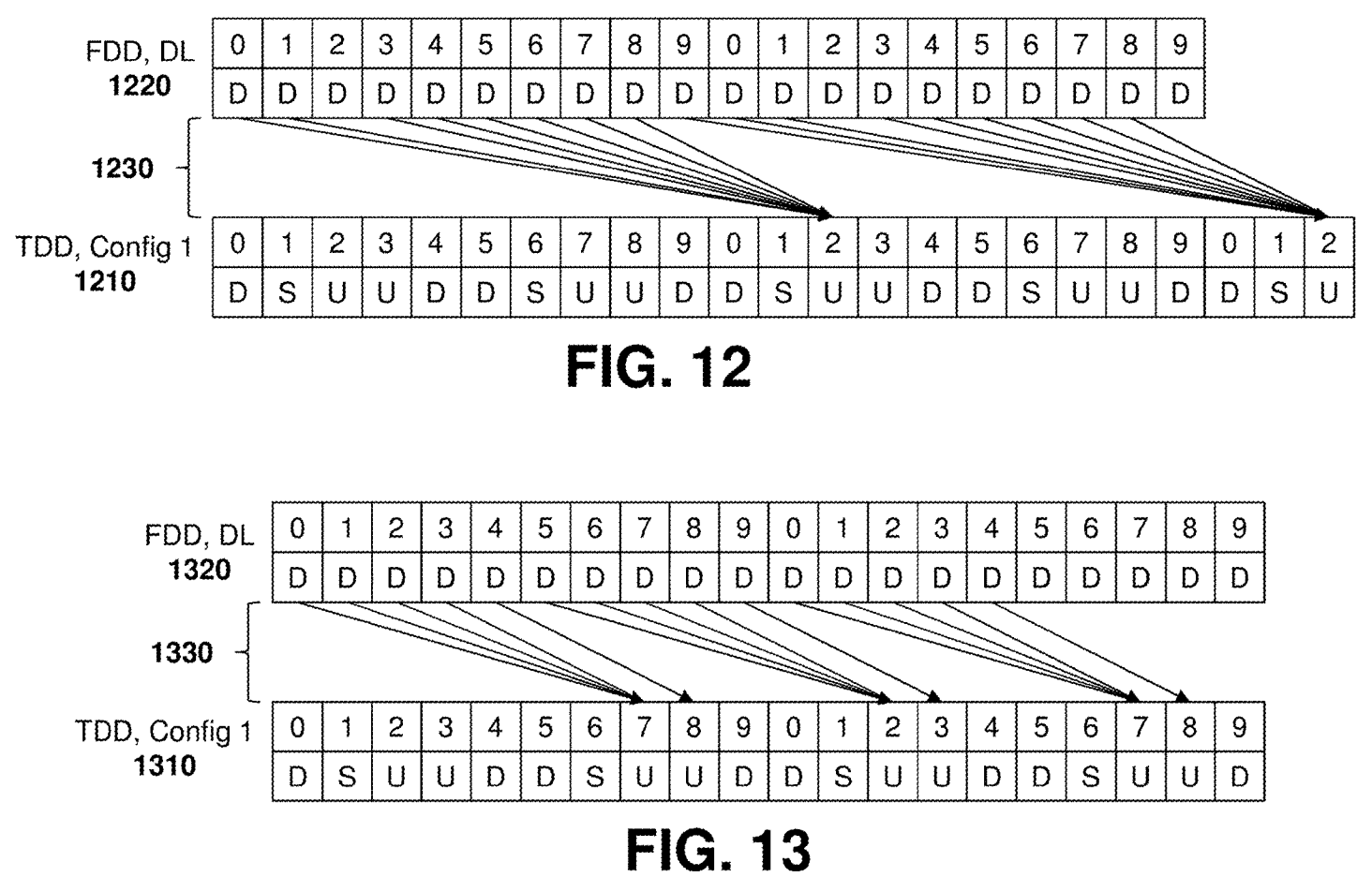

Reference is now made to FIG. 12, which illustrates one example of the alternative embodiment. In particular, the primary cell has a TDD configuration 1, as shown by reference numeral 1210 and the secondary cell 1220 has an FDD downlink configuration.

The example of FIG. 12 shows, using arrows 1230, that every subframe besides subframe 2 is able to provide ACK/NACK feedback on the subframe 2 of the primary cell.

From FIG. 12, the specific TDD configuration for the primary cell is irrelevant as all current TDD configurations have an uplink subframe at subframe 2.

ACK/NACK on Next Available Uplink Subframe

In a further embodiment, an ACK or NACK may be provided on all downlink PDSCH transmissions on every possible downlink subframe of the secondary carrier. This embodiment provides a way of transmitting the ACK/NACK bits on the next available TDD uplink subframe for the FDD PDSCH subframe that does not have a linked uplink subframe for an ACK/NACK transmission according to existing FDD PDSCH HARQ-ACK timing. In another embodiment, the next available rule may be specified in the standards, e.g. in a tabular form.

However, the processing delay still needs to be taken into consideration and thus the next available uplink subframe must be at least four subframes after the current one in one embodiment.

Reference is now made to FIG. 13, which shows an example of the embodiment. In the embodiment of FIG. 13, primary cell 1310 has a TDD configuration 1 whereas the secondary cell 1320 has an FDD configuration. In FIG. 13, as shown by arrows 1330, uplink subframe 7 provides acknowledgements for subframes 0, 1, 2 and 3.

Further, in the embodiment of FIG. 13, uplink subframe 8 is used to acknowledge subframe 4 and subframe 2 is used to acknowledge subframes 5, 6, 7, and 8. Subframe 3 is used to acknowledge subframe 9.

An eNB may decode the ACK or NACK for a corresponding FDD PDSCH based on the next availability rule above. In particular, the eNB would know that subframes 0, 1, 2 and 3 would provide their acknowledgement on subframe 7 as the eNB knows the TDD configuration of the UE. Similarly, the eNB would know where the remaining subframes provide their acknowledgments.

Balanced Load of ACK/NACK Bits

In a further alternative embodiment to the ACK/NACK on the next available uplink subframe, the distributing the ACK/NACK bits among available TDD uplink subframes to achieve a more balanced and optimal use of physical uplink controlled channel resources is provided. Such acknowledgements may be implemented utilizing a look-up table, for example.

In the present embodiment, the ACK/NACK bits may be spread to distribute them more evenly while keeping the change to the existing scheme as small as possible.

Currently, TDD HARQ ACK/NACK timing relationships for downlinks are defined by Section 10.1.3.1-1 of the 3GPP TS 36.213 Specification provided above. Table 2 above may be modified to accommodate the provision of ACK/NACK bits for PDSCH transmitted on a FDD carrier and is shown below with regard to Table 5.

TABLE 5

Downlink Association Set Index K: $\{k_0, k_1, \ldots k_{M-1}\}$

| UL-DL config. | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 5, 6 | 4, 5 | — | — | 6 | 5, 6 | 4, 5 |
| 1 | — | — | 7, 6 | 4, 5, 6 | — | — | — | 7, 6 | 4, 5, 6 | — |
| 2 | — | — | 8, 7, 4, 6, 5 | — | — | — | — | 8, 7, 4, 6, 5 | — | — |
| 3 | — | — | 11, 10, 9, 8 | 6, 7, 8 | 5, 4, 6 | — | — | — | — | — |
| 4 | — | — | 12, 8, 11, 10, 9 | 6, 5, 4, 7, 8 | — | — | — | — | — | — |
| 5 | — | — | 13, 12, 9, 8, 7, 5, 4, 11, 6, 10 | — | — | — | — | — | — | — |
| 6 | — | — | 7, 8 | 7, 6 | 5, 6 | — | — | 5, 6 | 5, 6 | — |

Table 5 is only one example of an embodiment of timing for a balanced load of ACK/NACK bits and other options exist. In accordance with the example of Table 5, the TDD uplink subframe n is associated with an FDD downlink subframe n–$k_i$, i=0 to M–1. The TDD uplink subframe n is used to convey ACK/NACK bits.

The embodiment of Table 5 ensures that each subframe in an FDD frame can always be associated with an uplink subframe of the TDD carrier with all existing TDD uplink/downlink configurations and that the processing delay allowance of four subframes is maintained.

Scheduling Embodiments

Due to the lack of PDCCH subframes in the TDD radio frame, some PDSCH and PUSCH frames may not be able to be scheduled by cross-carrier scheduling from the TDD carrier using current techniques. Thus, in the embodiments below, the ability to schedule every uplink and downlink subframe on an FDD carrier when a TDD carrier is configured to cross carrier schedule the FDD carrier are provided.

In a first embodiment, multi-subframe scheduling is provided. Multi-subframe scheduling is used to schedule multiple subframes via a single PDCCH. This is applicable to both downlink and uplink subframes.

Figures 14, 15:
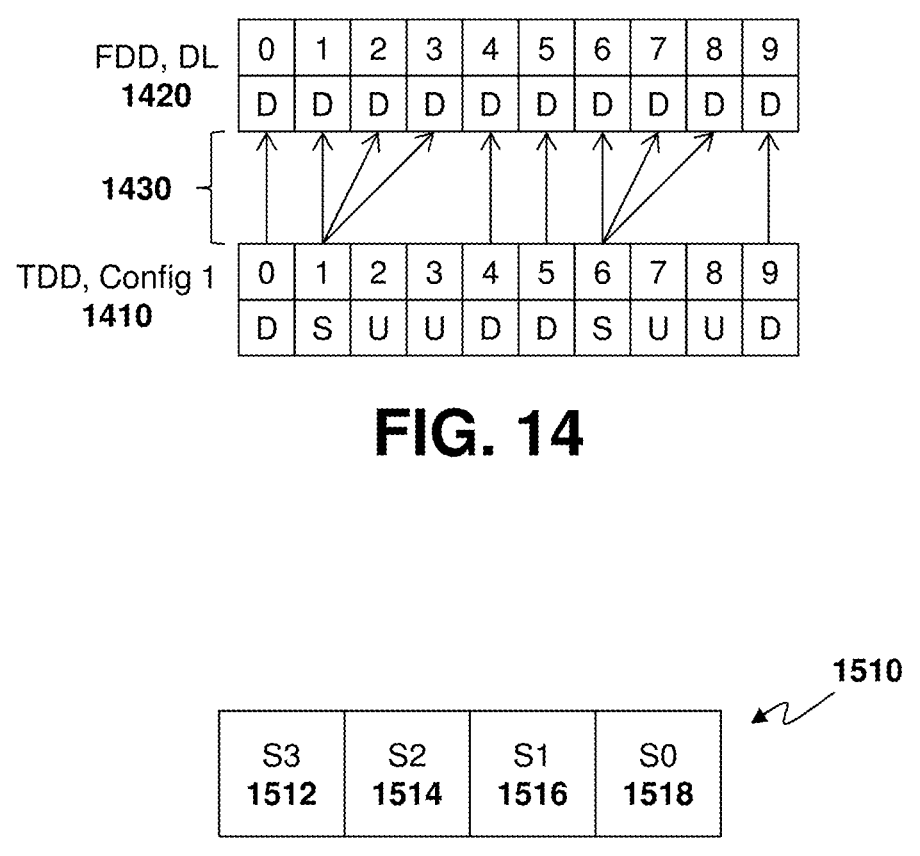

Reference is now made to FIG. 14, which provides a block diagram showing a TDD PCell 1410 and an FDD secondary cell 1420. In the embodiment of FIG. 14, the special cells are considered to be downlink cells and can be used to schedule multiple FDD subframes.

In particular, TDD PCell 1410 has TDD configuration 1 and thus subframe 0 is a downlink subframe, subframe 1 is a special subframe and subframes 2 and 3 are uplink subframes.

In accordance with the embodiment of FIG. 14, as shown by arrows 1430, subframes 2 and 3 of the FDD downlink are scheduled by subframe 1 on the TDD carrier. Similarly, subframes 7 and 8 of the FDD downlink may be scheduled by subframe 6 from the TDD carrier. In this way, all downlink subframes in the FDD carrier can be scheduled.

Multiple cross-carrier scheduling may be realized through the interaction of a bitmap field in existing PDSCH assignment DCIs to represent the number of PDSCH assignments and the position of these assignments. For example, reference is now made to FIG. 15, which shows a bitmap having four bits. In particular, bitmap 1510 includes bits 1512, 1514, 1516 and 1518.

From Table 1 above, the highest number of multiple PDSCH cross-carrier scheduling required is 4 since the maximum number of consecutive uplink subframes is 3 plus the current subframes. In this case, a four bit bitmap field is used to deal with all scenarios. In the bitmap a "1" may represent the PDSCH assignment presence at the subframe location and a "0" may indicate an absence of an assignment at that location.

In one embodiment bit 1512 may represent the current subframe and the 3 bits next to the bit 1512 are used for subsequent future subframes.

If, with certain TDD configurations, the number of downlink PDSCHs which require multiple PDSCH scheduling is less than 4, in one embodiment only the number of bits starting from the left hand side which equal to the number of possible PDSCH subframes in the TDD configuration are used. Since the UE knows the current TDD configuration, it is able to determine where the meaningful bits in the four bit bitmap field are.

For example, as shown in FIG. 14, the UE decodes a PDCCH at subframe 1 of the TDD carrier for possible PDSCH assignments of FDD carrier at subframes 1, 2 and 3. Since the UE knows the uplink/downlink TDD configuration, it only reads three bits from the left hand side of the bitmap of FIG. 15 to determine the intended PDSCH assignment subframes.

For example if the bitmap field is [1,0,1,0], then the UE knows that the last bit of the right hand side bears no meaning and would interpret the current DCI containing the PDSCH assignments for subframes 1 and 3.

In a further embodiment, instead of a fixed length of the bitmap, the UE and the eNB may adopt the correct size bit field according to the number of subframes required to be scheduled by multi-subframe scheduling. This is TDD uplink/downlink configuration dependent.

In yet a further embodiment, the redundant bits can be considered to refer to the next available downlink subframe. In this case, even though the downlink subframe may be scheduled in the current subframe, it may also have been scheduled in a previous downlink subframe. In this case, the previous configuration may be overridden by the current configuration in some cases.

In a further embodiment, if multiple PDSCH scheduling is always done in a consecutive fashion, two new fields may be introduced in the existing PDSCH assignment DCI. One field may be the number of subframe fields which represents the number of PDSCH subframes being scheduled. This may require 2 bits. The other field is the subframe offset which indicates the start point of the subframe being scheduled. This field also needs 2 bits.

With regard to existing parts of the DCI content, the HARQ information and Redundancy Version (RV) fields may be expanded into (1, N) arrays, where N is the number of subframes being scheduled in the DCI. Other fields, such as, radio bearer assignment, modulation and coding scheme (MCS), among others, may remain the same as in the current specification. All scheduled subframes can use the same resource block (RB) and modulation scheme.

In a further embodiment, the resource allocation for multiple subframes may be different. The DCI content may include all the different resource allocations, and for each allocation an offset field may be included to indicate which subframe is being allocated with the current subframe as the reference point. For example, the offset field could be two bits, which could indicate at most four future subframes. In another embodiment, the resource allocation for all the indicated subframes may be identical. In this case, only the subframe index may need to be included.

Multiple PUSCH Scheduling

For PUSCH transmission, because of the synchronous HARQ, HARQ, timing is harder to design, especially when the scheduling cell is TDD which usually does not have enough downlink subframes to cross-carrier schedule all uplink subframes in the FDD SCell. One further design consideration is to keep the synchronous nature of uplink HARQ.

Figure 16:
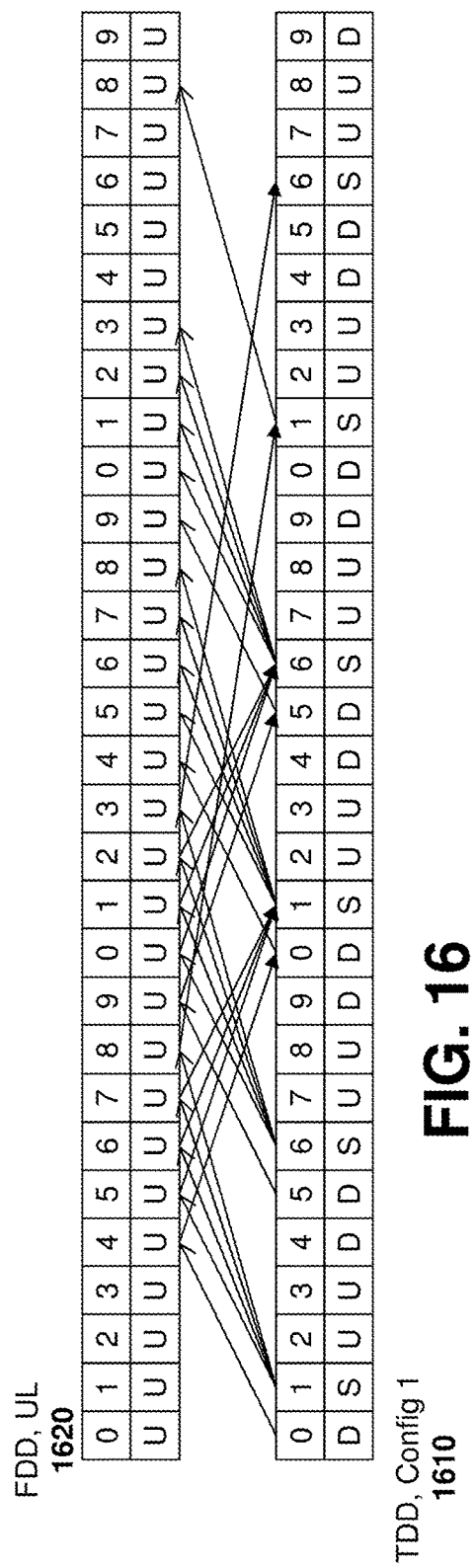
FIG. 16 is a timing diagram showing a timing scheme of PUSCH HARQ of a secondary FDD carrier for cross carrier scheduling from a TDD carrier.

Therefore, in accordance with one embodiment of the present disclosure, the timing scheme for the PUSCH transmission is illustrated with regard to FIG. 16.

As seen in FIG. 16, the PCell is a TDD configuration 1 cell and is shown with reference 1610. The secondary cell is shown with reference 1620 and is an FDD uplink carrier.

As seen in FIG. 16, a unified timing linkage scheme is provided. The scheme can be applied to any TDD uplink/downlink configuration when the scheduling cell is TDD and cross-carrier schedule uplink subframes in an FDD cell. This is because all scheduling grants and ACK/NACK bit transmissions are from subframes 0, 1, 5 and 6, which are always downlink, regardless of the TDD configuration.

With the timing scheme, the synchronous nature of uplink HARQ is maintained. The HARQ round trip time (RTT) of most subframes is 10 ms, except for subframes 3 and 8 which have a 20 ms round trip time. This may require 10 HARQ processes on the FDD uplink. The process ID has a one-to-one mapping with the subframe number and is given by equation 1 below.

$$UL\ HARQ\ Process\ ID = (SFN \times 10 + subframe) \bmod 10 \quad (1)$$

Based on equation 1 above, the subframe number implicitly represents the uplink HARQ process identifier.

With regard to scheduling, as shown by the arrows in FIG. 16, the timing scheme uses one downlink subframe to schedule multiple uplink subframe PUSCHs. For example, subframe 1 on the TDD cell may schedule subframes 5, 6, 7 and 8 on the FDD SCell uplink.

Similar to multiple PDSCH scheduling described above, the multiple PUSCH scheduling may be realized by introducing a bitmap field in existing PUSCH grant DCI to represent the number of PUSCH grants and the position of these uplink grants. As seen in FIG. 16, the most number of multiple PUSCH cross-carrier scheduling required is 4. Therefore, a 4-bit bitmap field may be used to provide for all possible scenarios. In one embodiment, a "1" may represent the PUSCH grant presence at the subframe location and a "0" may represent the absence of a grant at that location. In one embodiment, the most left hand side bit may represent the 'current plus four' subframe, and the three bits next to it are for subsequent future subframes.

Alternatively, if the multiple PUSCH scheduling is always done in a consecutive fashion, two new fields may be introduced in the existing PUSCH grant DCI. One is called the number of subframes field, which represents the number of PUSCH subframes being scheduled. In one example, this may be a 2 bit field because of the maximum number of multiple subframes is 4.

The other field is the subframe offset which indicates the start point of the subframe being scheduled. In other example, this field may use 2 bits as well. Other numbers of bits however may also be possible.

The HARQ process ID is implicitly indicated via the subframe number, and hence there is no need to communicate it in the PUSCH grant. Moreover, the process in a non-adaptive uplink HARQ process and the RV is determined through a predefined sequence, as specified in the 3GPP TS36.321 specification.

In an alternative embodiment, the uplink subframes 3 and 8 may be left unscheduled. In this way, the number of uplink HARQ processes required for the FDD carrier is 8, which are the same as in the standalone FDD carrier. Moreover, all of the HARQ round trip times would be the same at 10 ms in this case.

Cross-Subframe Scheduling

Further, the multi-subframe scheduling can improve the ability to cross-carrier schedule subframes on the FDD carrier from the TDD carrier. However, these multiple subframe assignments need to be directed to the same UE. In order to introduce more flexibility, cross-subframe scheduling is proposed.

In particular, in this embodiment, an index which indicates the subframe positions of downlink assignments or uplink grants is added to the corresponding DCI payload. Similar to the above embodiments, the maximum number of subframes to schedule is four. In this case, a two-bit index may be used to cope with all the possible scenarios. Table 6 below gives an example of downlink subframe position mapping indexes inserted into existing downlink assignment DCIs.

TABLE 6

DL subframe position index

| $b_1 b_0$ | subframe position |
|---|---|
| 00 | current DL subframe on FDD carrier |
| 01 | $1^{st}$ subsequent DL subframe on FDD carrier |
| 10 | $2^{nd}$ subsequent DL subframe on FDD carrier |
| 11 | $3^{rd}$ subsequent DL subframe on FDD carrier |

Table 7 shows uplink subframe position mapping indexes inserted into the existing DCI 0/DCI 4.

TABLE 7

UL subframe position index

| $b_1 b_0$ | subframe position |
|---|---|
| 00 | current subframe + 4 on UL FDD carrier |
| 01 | $1^{st}$ subsequent UL subframe on FDD carrier |
| 10 | $2^{nd}$ subsequent UL subframe on FDD carrier |
| 11 | $3^{rd}$ subsequent UL subframe on FDD carrier |

Tables 6 and 7 provide for cross subframe scheduling by providing the subframe position index for both the uplink and downlink.

The HARQ operations will need to be recognized by the network and in particular by a network element such as an eNB. A simplified network element is shown with regard to FIG. 17.

Figure 17:
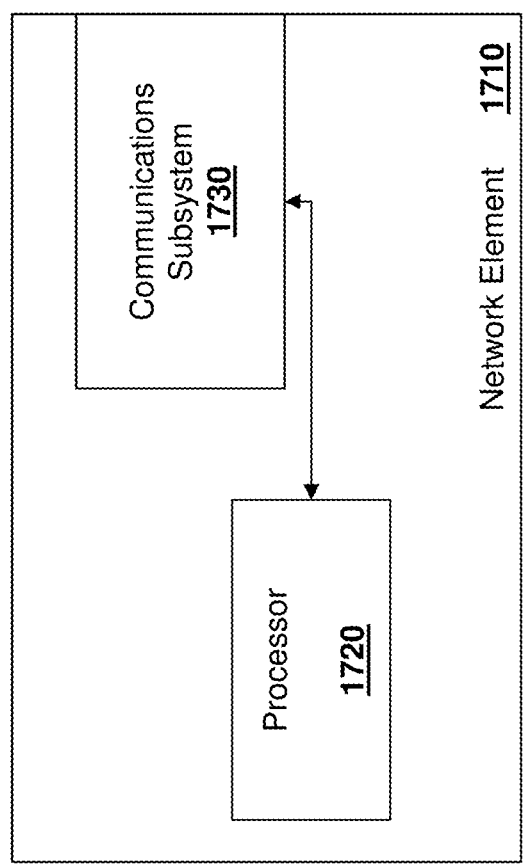
FIG. 17 is a simplified block diagram of an example network element.

In FIG. 17, network element 1710 includes a processor 1720 and a communications subsystem 1730, where the processor 1720 and communications subsystem 1730 cooperate to perform the methods described above.

Further, the above may be implemented by any UE. One exemplary device is described below with regard to FIG. 18.

UE 1800 is typically a two-way wireless communication device having voice and data communication capabilities. UE 1800 generally has the capability to communicate with other computer systems. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1800 is enabled for two-way communication, it may incorporate a communication subsystem 1811, including both a receiver 1812 and a transmitter 1814, as well as associated components such as one or more antenna elements 1816 and 1818, local oscillators (LOs) 1813, and a processing module such as a digital signal processor (DSP) 1820. As will be apparent to those skilled in the field of communications, the particular design of the communication subsystem 1811 will be dependent upon the communication network in which the device is intended to operate. The radio frequency front end of communication subsystem 1811 can be any of the embodiments described above.

Network access requirements will also vary depending upon the type of network 1819. In some networks network access is associated with a subscriber or user of UE 1800. A UE may require a removable user identity module (RUIM) or a subscriber identity module (SIM) card in order to operate on a network. The SIM/RUIM interface 1844 is normally similar to a card-slot into which a SIM/RUIM card can be inserted and ejected. The SIM/RUIM card can have memory and hold many key configurations 1851, and other information 1853 such as identification, and subscriber related information.

Figure 18:
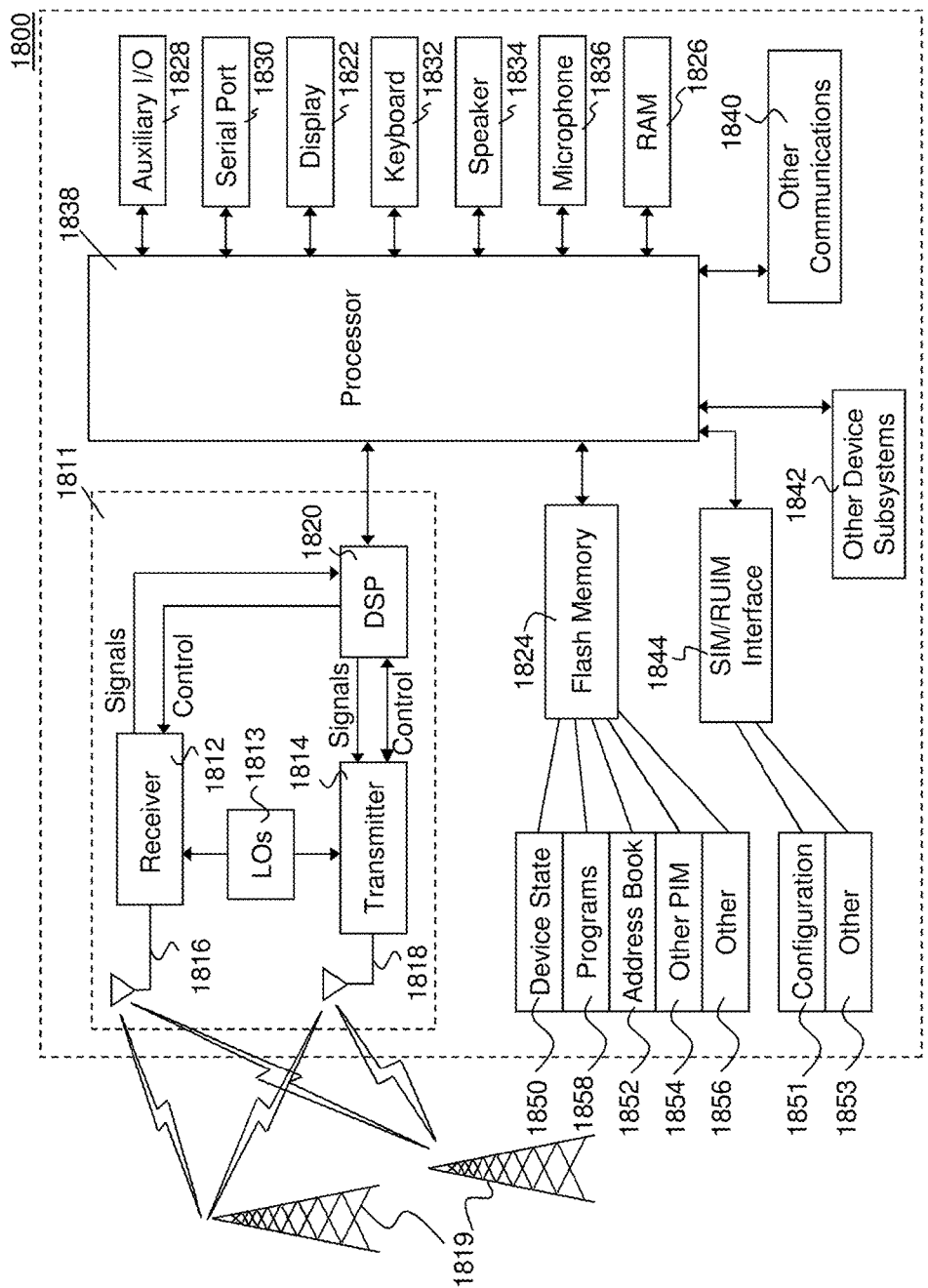
FIG. 18 is a block diagram of an example user equipment.

When required network registration or activation procedures have been completed, UE 1800 may send and receive communication signals over the network 1819. As illustrated in FIG. 18, network 1819 can consist of multiple base stations communicating with the UE.

Signals received by antenna 1816 through communication network 1819 are input to receiver 1812, which may perform such common receiver functions as signal amplification, frequency down conversion, filtering, channel selection and the like. A/D conversion of a received signal allows more complex communication functions such as demodulation and decoding to be performed in the DSP 1820. In a similar manner, signals to be transmitted are processed, including modulation and encoding for example, by DSP 1820 and input to transmitter 1814 for digital to analog conversion, frequency up conversion, filtering, amplification and transmission over the communication network 1819 via antenna 1818. DSP 1820 not only processes communication signals, but also provides for receiver and transmitter control. For example, the gains applied to communication signals in receiver 1812 and transmitter 1814 may be adaptively controlled through automatic gain control algorithms implemented in DSP 1820.

UE 1800 generally includes a processor 1838 which controls the overall operation of the device. Communication functions, including data and voice communications, are performed through communication subsystem 1811. Processor 1838 also interacts with further device subsystems such as the display 1822, flash memory 1824, random access memory (RAM) 1826, auxiliary input/output (I/O) subsystems 1828, serial port 1830, one or more keyboards or keypads 1832, speaker 1834, microphone 1836, other communication subsystem 1840 such as a short-range communications subsystem and any other device subsystems generally designated as 1842. Serial port 1830 could include a USB port or other port known to those in the art.

Some of the subsystems shown in FIG. 18 perform communication-related functions, whereas other subsystems may provide "resident" or on-device functions. Notably, some subsystems, such as keyboard 1832 and display 1822, for example, may be used for both communication-related functions, such as entering a text message for transmission over a communication network, and device-resident functions such as a calculator or task list.

Operating system software used by the processor 1838 may be stored in a persistent store such as flash memory 1824, which may instead be a read-only memory (ROM) or similar storage element (not shown). Those skilled in the art will appreciate that the operating system, specific device applications, or parts thereof, may be temporarily loaded into a volatile memory such as RAM 1826. Received communication signals may also be stored in RAM 1826.

As shown, flash memory 1824 can be segregated into different areas for both computer programs 1858 and program data storage 1850, 1852, 1854 and 1856. These different storage types indicate that each program can allocate a portion of flash memory 1824 for their own data storage requirements. Processor 1838, in addition to its operating system functions, may enable execution of software applications on the UE. A predetermined set of applications that control basic operations, including at least data and voice communication applications for example, will normally be installed on UE 1800 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1819. Further applications may also be loaded onto the UE 1800 through the network 1819, an auxiliary I/O subsystem 1828, serial port 1830, short-range communications subsystem 1840 or any other suitable subsystem 1842, and installed by a user in the RAM 1826 or a non-volatile store (not shown) for execution by the processor 1838. Such flexibility in application installation increases the functionality of the device and may provide enhanced on-device functions, communication-related functions, or both. For example, secure communication applications may enable electronic commerce functions and other such financial transactions to be performed using the UE 1800.

In a data communication mode, a received signal such as a text message or web page download will be processed by the communication subsystem 1811 and input to the processor 1838, which may further process the received signal for output to the display 1822, or alternatively to an auxiliary I/O device 1828.

A user of UE 1800 may also compose data items such as email messages for example, using the keyboard 1832, which may be a complete alphanumeric keyboard or telephone-type keypad, among others, in conjunction with the display 1822 and possibly an auxiliary I/O device 1828. Such composed items may then be transmitted over a communication network through the communication subsystem 1811.

For voice communications, overall operation of UE 1800 is similar, except that received signals would typically be output to a speaker 1834 and signals for transmission would be generated by a microphone 1836. Alternative voice or audio I/O subsystems, such as a voice message recording subsystem, may also be implemented on UE 1800. Although voice or audio signal output is generally accomplished primarily through the speaker 1834, display 1822 may also be used to provide an indication of the identity of a calling party, the duration of a voice call, or other voice call related information for example.

Serial port 1830 in FIG. 18 would normally be implemented in a personal digital assistant (PDA)-type UE for which synchronization with a user's desktop computer (not shown) may be desirable, but is an optional device component. Such a port 1830 would enable a user to set preferences through an external device or software application and would extend the capabilities of UE 1800 by providing for information or software downloads to UE 1800 other than through a wireless communication network. The alternate download path may for example be used to load an encryption key onto the device through a direct and thus reliable and trusted connection to thereby enable secure device communication. As will be appreciated by those skilled in the art, serial port 1830 can further be used to connect the UE to a computer to act as a modem.

Other communications subsystems 1840, such as a short-range communications subsystem, is a further optional component which may provide for communication between UE 1800 and different systems or devices, which need not necessarily be similar devices. For example, the subsystem 1840 may include an infrared device and associated circuits and components or a Bluetooth™ communication module to provide for communication with similarly enabled systems and devices. Subsystem 1840 may further include non-cellular communications such as WiFi, WiMAX, or near field communications (NFC).

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein. Further, various embodiments are shown with regards to the clauses below:

AA. A method at a user equipment for hybrid automatic repeat request (HARQ) operation, the user equipment operating on a primary carrier having a first duplex mode and on at least one secondary carrier having a second duplex mode, the method comprising: using HARQ timing operation of a predetermined configuration of the first duplex mode for the at least one secondary carrier, wherein the predetermined configuration is used regardless of the configuration of the first duplex mode on the primary carrier.

BB. The method of clause AA, wherein the first duplex mode is time division duplex (TDD).

CC. The method of clause BB, wherein the predetermined configuration is chosen based on the periodicity of the primary carrier.

DD. The method of clause CC, wherein the predetermined configuration is TDD configuration 2 physical downlink shared channel (PDSCH) timing for a 5 ms periodicity and TDD configuration 5 PDSCH timing for a 10 ms periodicity.

EE. The method of clause AA, wherein the predetermined configuration is TDD configuration 5 physical downlink shared channel (PDSCH) timing.

FF. A user equipment for hybrid automatic repeat request (HARQ) operation, the user equipment operating on a primary carrier having a first duplex mode and on at least one secondary carrier having a second duplex mode, the user equipment comprising a processor configured to: use HARQ timing operation of a predetermined configuration of the first duplex mode for the at least one secondary carrier, wherein the predetermined configuration is used regardless of the configuration of the first duplex mode on the primary carrier.

GG. The user equipment of clause FF, wherein the first duplex mode is time division duplex (TDD).

HH. The user equipment of clause GG, wherein the predetermined configuration is chosen based on the periodicity of the primary carrier.

II. The user equipment of clause HH, wherein the predetermined configuration is TDD configuration 2 physical downlink shared channel (PDSCH) timing for a 5 ms periodicity and TDD configuration 5 PDSCH timing for a 10 ms periodicity.

JJ. The user equipment of clause FF, wherein the predetermined configuration is TDD configuration 5 physical downlink shared channel (PDSCH) timing.

KK. A method at a user equipment for hybrid automatic repeat request (HARQ) operation, the user equipment operating on a primary carrier having a first duplex mode and on at least one secondary carrier having a second duplex mode, the method comprising: utilizing an available uplink subframe after a predetermined processing delay on the primary carrier for acknowledgement of a subframe on the secondary carrier.

LL. The method of clause KK, wherein the available uplink subframe is a next available uplink subframe after the predetermined processing delay.

MM. The method of clause KK., wherein the predetermined processing delay is four subframes.

NN. The method of clause KK, wherein the available uplink subframe is determined based on a lookup table.

OO. The method of clause NN, wherein the lookup table distributes acknowledgements between uplink subframes on the primary carrier.

PP. The method of clause NN, wherein the lookup table ensures each subframe on the secondary carrier is associated with an uplink subframe.

QQ. A user equipment for hybrid automatic repeat request (HARQ) operation, the user equipment operating on a primary carrier having a first duplex mode and on at least one secondary carrier having a second duplex mode, the user equipment comprising a processor configured to: use an available uplink subframe after a predetermined processing delay on the primary carrier for acknowledgement of a subframe on the secondary carrier.

RR. The user equipment of clause QQ, wherein the available uplink subframe is a next available uplink subframe after the predetermined processing delay.

SS. The user equipment of clause QQ, wherein the predetermined processing delay is four subframes.

TT. The user equipment of clause QQ, wherein the available uplink subframe is determined based on a lookup table.

UU. The user equipment of clause TT, wherein the lookup table distributes acknowledgements between uplink subframes on the primary carrier.

VV. The user equipment of clause TT, wherein the lookup table ensures each subframe on the secondary carrier is associated with an uplink subframe.

WW. A method at a user equipment for downlink cross-carrier scheduling at least one secondary carrier having a second duplex mode using a primary carrier having a first duplex mode, the method comprising: receiving downlink scheduling information from a network element, the downlink scheduling information including scheduling for a current subframe and future subframes on the secondary carrier; and receiving data on the secondary carrier based on the downlink scheduling information.

XX. The method of clause WW, wherein the downlink scheduling information is received as part of a downlink control information assignment.

YY. The method of clause XX, wherein the downlink scheduling information is received as a bitmap.

ZZ. The method of clause YY, wherein the bitmap is of fixed size to schedule a current subframe and a maximum number of future subframes.

AAA. The method of clause ZZ, wherein the maximum number of subframes is determined based on a long term evolution time division duplex configuration.

BBB. The method of clause AAA, wherein, if not all bits in the bitmap are needed for scheduling, the unneeded bits are ignored by the user equipment.

CCC. The method of clause AAA, wherein if not all bits in the bitmap are needed for scheduling, the bitmap includes redundant scheduling for future subframes.

DDD. The method of clause YY, wherein the bitmap is of variable length based on a number of subframes being scheduled.

EEE. The method of clause XX, wherein the downlink scheduling information includes a first field to indicate a number of subframes being scheduled and a second field to indicate an offset for a scheduling start point.

FFF. A user equipment for downlink cross-carrier scheduling at least one secondary carrier having a second duplex mode using a primary carrier having a first duplex mode, the user equipment comprising a processor configured to: receive downlink scheduling information from a network element, the downlink scheduling information including scheduling for a current subframe and future subframes on the secondary carrier; and receive data on the secondary carrier based on the downlink scheduling information.

GGG. The user equipment of clause FFF, wherein the downlink scheduling information is received as part of a downlink control information assignment.

HHH. The user equipment of clause GGG, wherein the downlink scheduling information is received as a bitmap.

III. The user equipment of clause HHH, wherein the bitmap is of fixed size to schedule a current subframe and a maximum number of future subframes.

JJJ. The user equipment of clause Ill, wherein the maximum number of subframes is determined based on a long term evolution time division duplex configuration.

KKK. The user equipment of clause JJJ, wherein, if not all bits in the bitmap are needed for scheduling, the unneeded bits are ignored by the user equipment.

LLL. The user equipment of clause JJJ, wherein if not all bits in the bitmap are needed for scheduling, the bitmap includes redundant scheduling for future subframes.

MMM. The user equipment of clause HHH, wherein the bitmap is of variable length based on a number of subframes being scheduled.

NNN. The user equipment of clause Ill, wherein the downlink scheduling information includes a first field to indicate a number of subframes being scheduled and a second field to indicate an offset for a scheduling start point.

NNN. A method at a user equipment for uplink cross-carrier scheduling at least one secondary carrier having a frequency division duplex (FDD) mode using a primary carrier having time division duplex (TDD) mode, the method comprising: utilizing a subset of subframes for uplink scheduling of the at least one secondary carrier, wherein the subset of subframes are downlink subframes in all TDD configurations; and receiving acknowledgments on the subset of subframes, wherein the acknowledgments are received on the same subframe number as the subframe used for uplink scheduling.

OOO. The method of clause NNN, wherein the subframes for uplink scheduling are used to schedule multiple uplink subframes on the secondary carrier.

PPP. The method of clause OOO, wherein the scheduling information is received in a bitmap in a downlink control information grant.

QQQ. The method of clause OOO, wherein the scheduling information is received in at least two fields in a downlink control information grant, a first field indicating a number of subframes to be scheduled and a second field indicating a subframe offset.

RRR. The method of clause NNN, wherein the subset of subframes are subframes 0, 1, 5 and 6.

SSS. A user equipment for uplink cross-carrier scheduling at least one secondary carrier having a frequency division duplex (FDD) mode using a primary carrier having time division duplex (TDD) mode, the user equipment comprising a processor configured to: utilize a subset of subframes for uplink scheduling of the at least one secondary carrier, wherein the subset of subframes are downlink subframes in all TDD configurations; and receive acknowledgments on the subset of subframes, wherein the acknowledgments are received on the same subframe number as the subframe used for uplink scheduling.

TTT. The user equipment of clause SSS, wherein the subframes for uplink scheduling are used to schedule multiple uplink subframes on the secondary carrier.

UUU. The user equipment of clause TTT, wherein the scheduling information is received in a bitmap in a downlink control information grant.

VVV. The user equipment of clause TTT, wherein the scheduling information is received in at least two fields in a downlink control information grant, a first field indicating a number of subframes to be scheduled and a second field indicating a subframe offset.

WWW. The user equipment of clause SSS, wherein the subset of subframes are subframes 0, 1, 5 and 6.

The invention claimed is:

1. A method, at a user equipment for subframe scheduling operation, the user equipment operating on a primary carrier having a time division duplex (TDD) mode and at least one secondary carrier having a frequency division duplex (FDD) mode, the method comprising:
receiving on the primary carrier a Downlink Control Information (DCI) on a Physical Downlink Control Channel (PDCCH), the DCI comprising an assignment bitmap for the secondary carrier, wherein each bit in the assignment bitmap corresponds to a subframe, and wherein a value of each bit indicates whether the corresponding subframe is scheduled;
determining a plurality of subframes from the assignment bitmap;
scheduling on the secondary carrier the subframes determined from the assignment bitmap;
wherein the assignment bitmap comprises a number of bits equal to a number of consecutive uplink subframes of a TDD configuration of the primary carrier following a current subframe plus one.

2. The method of claim 1, wherein only a subset of bits of the assignment bitmap are used, the subset being selected based on a TDD configuration of the primary carrier and a current subframe.

3. The method of claim 2, wherein the subset comprises a number of bits equal to a number of consecutive uplink subframes of the TDD configuration following the current subframe plus one.

4. The method of claim 3, wherein bits of the assignment bitmap which are not in the subset include scheduling information for a next available downlink subframe.

5. The method of claim 1, wherein the assignment bitmap comprises a first field indicating a number of subframes and a second field indicating a subframe offset, and wherein the scheduling comprises scheduling the number of consecutive subframes starting from the indicated subframe offset.

6. The method of claim 1, further comprising a plurality of resource allocations, each resource allocation comprising an offset field indicating a subframe based on a current subframe.

7. The method of claim 1, wherein the scheduled subframes are uplink subframes.

8. The method of claim 7, wherein a Hybrid Automatic Repeat reQuest (HARD) process identifier for each scheduled subframe is determined from a subframe number.

9. The method of claim 1, wherein the assignment bitmap comprises an index which maps to a subframe position relative to a current subframe.

10. A user equipment operating on a primary carrier having a time division duplex (TDD) mode and at least one secondary carrier having a frequency division duplex (FDD) mode, the user equipment comprising:
a processor; and
a communications subsystem;
wherein the processor and communication subsystem cooperate to:
receive on the primary carrier a Downlink Control Information (DCI) on a Physical Downlink Control Channel (PDCCH), the DCI comprising an assignment bitmap for the secondary carrier, wherein each bit in the assignment bitmap corresponds to a subframe, and wherein a value of each bit indicates whether the corresponding subframe is scheduled;
determine a plurality of subframes from the assignment bitmap;
schedule on the secondary carrier the subframes determined from the assignment bitmap;
wherein the assignment bitmap comprises a number of bits equal to a number of consecutive uplink subframes of a TDD configuration of the primary carrier following a current subframe plus one.

11. The user equipment of claim 10, wherein only a subset of bits of the assignment bitmap are used, the subset comprising a number of bits equal to a number of consecutive uplink subframes of the TDD configuration following the current subframe plus one.

12. The user equipment of claim 11, wherein bits of the assignment bitmap which are not in the subset include scheduling information for a next available downlink subframe.

13. The user equipment of claim 10, wherein the assignment bitmap comprises a first field indicating a number of subframes and a second field indicating a subframe offset, and wherein the scheduling comprises scheduling the number of consecutive subframes starting from the indicated subframe offset.

14. The user equipment of claim 10, wherein the assignment bitmap comprises a plurality of resource allocations, each resource allocation comprising an offset field indicating a subframe based on a current subframe.

15. The user equipment of claim 10, wherein the scheduled subframes are uplink subframes.

16. The user equipment of claim 10, wherein a Hybrid Automatic Repeat reQuest (HARQ) process identifier for each scheduled subframe is determined from a subframe number.

* * * * *